(12) United States Patent
Wuertele

(10) Patent No.: US 9,766,608 B2
(45) Date of Patent: Sep. 19, 2017

(54) POWER TOOL AND METHOD FOR OPERATING A POWER TOOL

(71) Applicant: Robert Bosch GmbH, Stuttgart (DE)

(72) Inventor: Christian Wuertele, Mannheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 350 days.

(21) Appl. No.: 13/654,643

(22) Filed: Oct. 18, 2012

(65) Prior Publication Data

US 2013/0103169 A1 Apr. 25, 2013

(30) Foreign Application Priority Data

Oct. 19, 2011 (DE) .................. 10 2011 084 766

(51) Int. Cl.
*G06F 19/00* (2011.01)
*G05B 19/02* (2006.01)
*G05B 19/042* (2006.01)

(52) U.S. Cl.
CPC ........... *G05B 19/02* (2013.01); *G05B 19/042* (2013.01); *G05B 2219/25131* (2013.01); *G05B 2219/25136* (2013.01); *G05B 2219/2656* (2013.01)

(58) Field of Classification Search
USPC ...... 700/113, 83, 17, 286, 168; 173/1, 2, 20, 173/217; 230/134, 106; 318/413, 811; 81/479, 468, 478
See application file for complete search history.

(56) References Cited

U.S. PATENT DOCUMENTS

| | | | | |
|---|---|---|---|---|
| 5,857,166 A * | 1/1999 | Kim | ................................ | 702/179 |
| 6,005,489 A * | 12/1999 | Siegle | ................ | G08B 13/1418 |
| | | | | 310/50 |
| 6,836,536 B2 * | 12/2004 | Huang | ............................ | 379/21 |
| 6,836,614 B2 * | 12/2004 | Gilmore | ........................ | 388/811 |
| 6,913,087 B1 * | 7/2005 | Brotto | ..................... | B25B 21/00 |
| | | | | 173/1 |
| 7,112,934 B2 * | 9/2006 | Gilmore | ........................ | 318/432 |
| 7,795,829 B2 * | 9/2010 | Seiler | ........................... | 318/432 |
| 8,505,649 B2 * | 8/2013 | Scrimshaw | .................... | 173/176 |
| 8,752,645 B2 * | 6/2014 | Liebhard | ...................... | 173/217 |
| 8,800,679 B2 * | 8/2014 | Eshleman | ........................ | 173/1 |
| 2002/0050364 A1 * | 5/2002 | Suzuki | ..................... | B25B 21/02 |
| | | | | 173/1 |
| 2002/0153856 A1 * | 10/2002 | Gilmore | ........................ | 318/599 |
| 2003/0037423 A1 * | 2/2003 | Siegel | ..................... | B23P 19/066 |
| | | | | 29/407.01 |
| 2003/0149508 A1 * | 8/2003 | Watanabe | ....................... | 700/168 |
| 2004/0085193 A1 * | 5/2004 | Crowell | ............... | B23D 59/008 |
| | | | | 700/83 |

(Continued)

FOREIGN PATENT DOCUMENTS

| | | |
|---|---|---|
| CN | 1651197 A | 8/2005 |
| CN | 201349196 Y | 11/2009 |

(Continued)

*Primary Examiner* — Kidest Bahta
(74) *Attorney, Agent, or Firm* — Norton Rose Fulbright US LLP; Gerard Messina

(57) ABSTRACT

A power tool having a digital control unit is provided, an interface of the digital control unit being switchable between standard operation and communication operation. In communication operation, operating data of the power tool are able to be transmitted via the interface.

22 Claims, 5 Drawing Sheets

(56) References Cited

U.S. PATENT DOCUMENTS

| | | | | |
|---|---|---|---|---|
| 2005/0011655 A1* | 1/2005 | Crowell | ................ | B25B 23/14 |
| | | | | 173/1 |
| 2005/0103510 A1* | 5/2005 | Gass | ................... | B23B 31/123 |
| | | | | 173/217 |
| 2006/0155582 A1* | 7/2006 | Brown | ............... | A61B 5/0002 |
| | | | | 705/3 |
| 2008/0135272 A1* | 6/2008 | Wallgren | ........... | H01M 2/1022 |
| | | | | 173/217 |
| 2008/0196912 A1* | 8/2008 | Gass | ................... | B23B 31/123 |
| | | | | 173/4 |
| 2009/0165609 A1* | 7/2009 | Cho | .............................. | 81/470 |
| 2009/0254203 A1* | 10/2009 | Gerold et al. | ................. | 700/87 |
| 2011/0198102 A1* | 8/2011 | Gairing | ................... | B25F 3/00 |
| | | | | 173/29 |

FOREIGN PATENT DOCUMENTS

| | | | |
|---|---|---|---|
| CN | 101784373 A | 7/2010 | |
| CN | 102036787 A | 4/2011 | |

\* cited by examiner

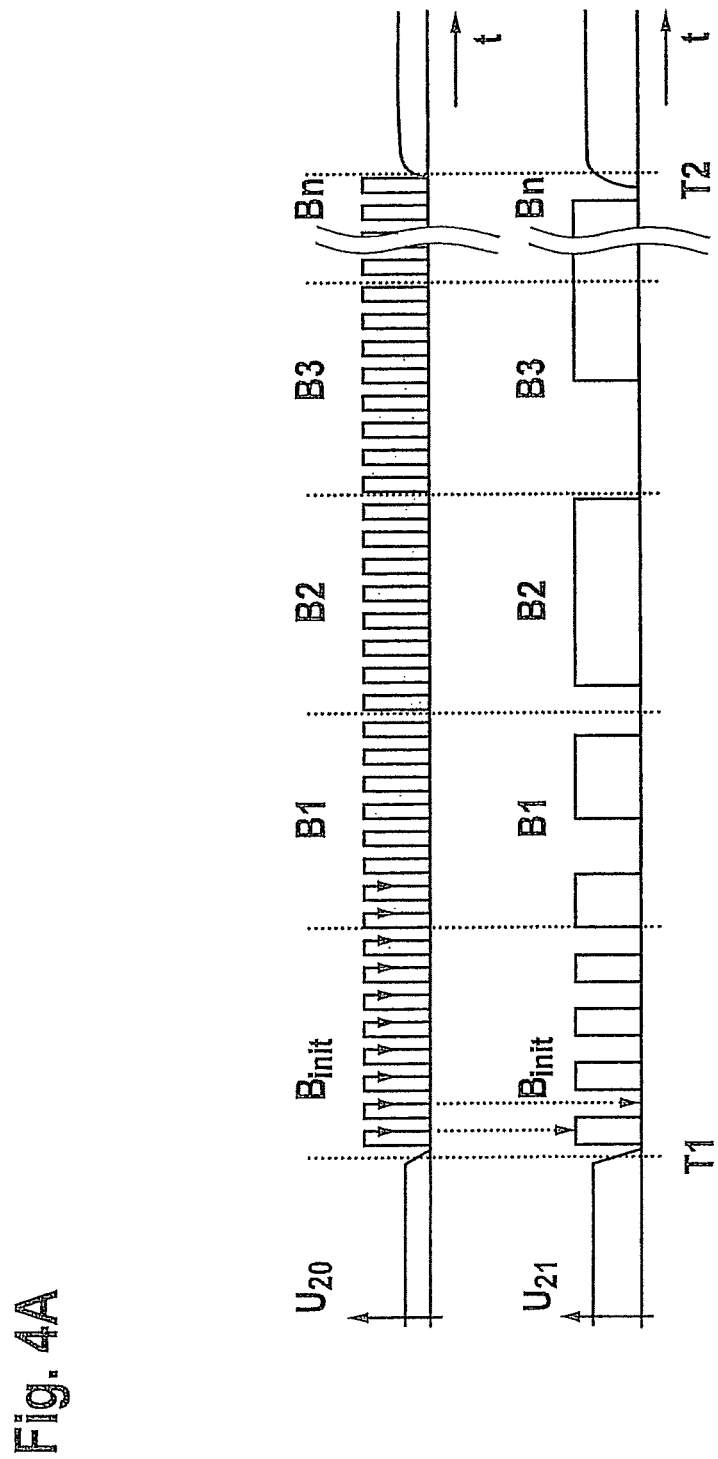

POWER TOOL AND METHOD FOR OPERATING A POWER TOOL

CROSS REFERENCE TO RELATED APPLICATION

The present application claims priority to Application No. DE 10 2011 084 766.9, filed in the Federal Republic of Germany on Oct. 19, 2011, which is expressly incorporated herein in its entirety by reference thereto.

FIELD OF INVENTION

The present invention relates to a power tool and to a method for operating a power tool.

BACKGROUND INFORMATION

During the development phases of portable, battery- or accumulator-operated power tools, comprehensive testing of prototypes is often carried out in the early stages already. Such testing normally focuses on recording important characteristic quantities of an electronic system and a motor of the power tool and its analysis. These data are required for an optimal configuration of the power tool in order to thereby achieve increased robustness of the power tool in field use.

Important variables of battery-operated power tools that must be monitored are, for instance: the motor current, the output battery current, the temperature of accumulator packs or cells, the temperature of the electronic system, and the electrical voltage.

These tests usually require time-consuming redesigns of the prototypes. For example, access to electrical lines of the prototype inside the housing requires the housing shells of the prototypes to be provided with through-holes via which diverse electrical measuring lines can be routed out of the prototype. In addition, it may be necessary to modify line lengths or routes of the internal motor control electronics so as to route them out of the unit. This makes it possible, for example, to measure a motor current or a battery current in the installed state of the power tool, using a current-measuring caliper. In addition, measuring lines may possibly need to be mounted directly on an electronics board, or temperature sensors may have to be fixed in place thereon.

In summary, all of the afore-mentioned measures may entail considerable interventions in and modifications of the power tool, which could have a disadvantageous effect on the internal marginal conditions of the power tool.

SUMMARY

Therefore, it is an object of the present invention to provide operating data of battery-operated power tools in more optimized manner.

The objective is achieved by a power tool having a digital control unit, in which an interface of the digital control unit is switchable between standard operation and communication operation, and operating data of the power tool are transmittable via the interface during communication operation.

One advantage of the power tool according to the present invention is that an already existing infrastructure of the power tool, in the form of an interface of the digital control unit, is able to be utilized according to the present invention. In so doing, the interface is switched between standard operation and communication operation; in communication operation, the interface is used to transmit operating data of the power tool via the interface. This has the advantage that no interventions in the power tool are necessary in order to acquire the operating data.

In one preferred exemplary embodiment of the power tool according to the present invention, the interface is periodically switchable between standard operation and communication operation, and the operating data are able to be output by way of the interface. The periodic switching between standard operation and communication operation of the interface advantageously makes it possible to monitor a time characteristic of the operating data in continuous manner. This allows a better analysis of a longterm behavior of the power tool.

In one preferred exemplary embodiment of the power tool according to the present invention, the interface is an interface between an electric energy store device and the digital control unit. In this way a technical infrastructure of the battery-operated power tool, in the form of a generally already existing accumulator interface between the electrical energy store device and the digital control unit, is utilized as well according to the present invention. A digital control unit furthermore has the advantage that connections to input pins are able to be switched to output pins in an uncomplicated manner.

In one preferred exemplary embodiment of the power tool according to the present invention, the operating data are able to be output via supply lines or via code lines of the interface. This provided selection option has the advantage that two different line pairs of the standardized interface between the energy supply device and the digital control unit are able to be utilized for transmitting the operating data. Even if only one line pair is available, the operating data are able to be transmitted. This advantageously increases the design freedom for the transmission of the operating data according to the present invention.

Preferably, it is provided that the operating data are transmittable by means of a modulation method, via the supply lines of the interface. This advantageously makes it possible to use a fully developed technology for the transmission of the operating data. In addition, the most suitable modulation type is advantageously able to be selected from among the different modulation methods.

One advantageous further development of the power tool according to the present invention provides that the interface is formed from control lines of a light-emitting diode of the power tool. In this way, it is advantageously possible to use an already existing infrastructure of the battery-operated power tool for the transmission of the operating data using optical means.

In one advantageous exemplary development of the power tool according to the present invention, the operating data are storable by means of a storage device during standard operation of the power tool. This results in a data-recording effect, which allows the operating data to be recorded across a defined period of time, and thus enables a comprehensive data analysis.

In one preferred exemplary embodiment of the power tool according to the present invention, the stored operating data of the storage device are able to be output by the power tool with the aid of a transmission device. The stored operating data may thus be forwarded for further processing, the operating data, for example, being able to be analyzed in an analysis process outside of the power tool, using suitable analyzing tools.

In one advantageous further refinement of the power tool, the power tool is equipped with a data acquisition device for acquiring the transmitted operating data. This advantageously makes it possible to record and analyze the stored operating data.

In one advantageous refinement of the power tool according to the present invention, the data acquisition device is situated inside or outside the power tool. This advantageously diversifies an acquisition type of the operating data. In a system inside the tool, for example, the operating data are preferably able to be acquired and recorded more on a long-term basis. In an external placement on the power tool, on the other hand, the aspect of immediate availability of the operating data is in the fore.

In the following, exemplary embodiments of the present invention are described in detail together with additional advantages and features, with reference to the accompany drawings. It is understood, of course, that the drawings are primarily meant to illustrate the principles of the present invention and that already known principles of battery-operated power tools are not described in further detail.

BRIEF DESCRIPTION OF THE DRAWINGS

FIG. 4A illustrates a schematic time diagram of a data transmission according to the present invention, via an accumulator interface, featuring a dual assignment, of a power tool according to the present invention.

DETAILED DESCRIPTION

Figure 1A:
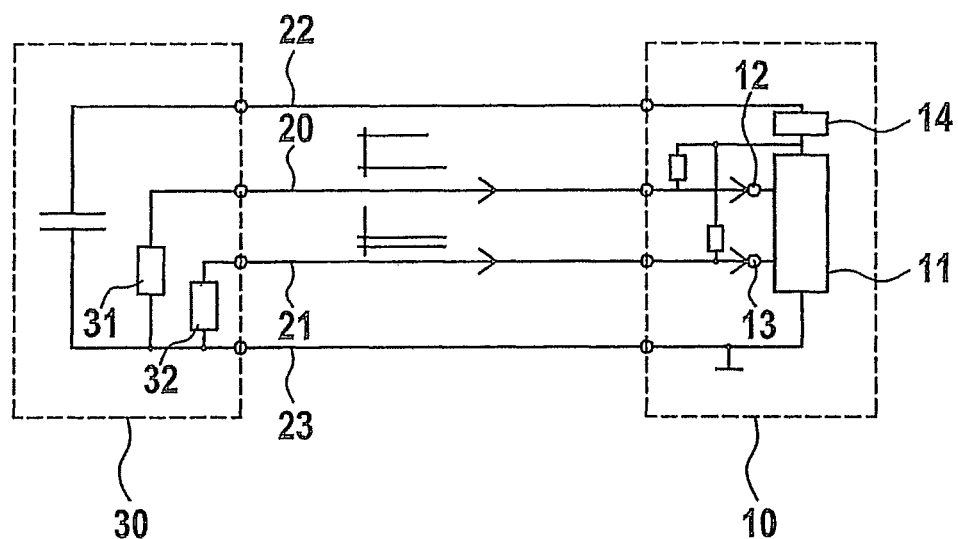
FIG. 1A illustrates a basic representation of an interface between an energy store device and a digital control unit of a conventional power tool.

FIG. 1A shows an interface between an energy store device 30 and a digital control unit 10 of a conventional power tool (not shown) in greatly simplified form. For instance, energy store device 30 may be developed as any type of electrochemical energy store (e.g., an accumulator or a system of several battery cells, a battery, etc.). Energy store device 30, for example, may be implemented as a lithium-ion accumulator provided with a standardized accumulator interface having four terminals. A first code resistor 31, which preferably is developed as a temperature-dependent electrical resistor (e.g., thermistor NTC), may be used to code the internal temperature of energy store device 30 in terms of voltage. A second code resistor 32 may code a type (accumulator type, series, capacitance, connection type, etc.) of energy store device 30 in terms of voltage.

Four lines 20, 21, 22, 23, which are connected to the four terminals of the interface of energy store device 30 in electrically conductive manner, are used to transmit the mentioned information to digital control unit 10 of the power tool in analog manner or to supply the power tool with electrical energy. To do so, supply lines 22, 23 are used to apply an electrical direct voltage to digital control unit 10 or to the power tool. The direct voltage is able to be adapted to a required voltage level within digital control unit 10 by means of a voltage converter 14. In addition, a first code line 20 and a second code line 21 are employed in order to transmit the mentioned specific information regarding energy store device 30 to digital control unit 10.

For example, a first code line 20 may be used to transmit an internal temperature of energy store device 30 to digital control unit 10, an electrical voltage within digital control device 10 being routed to a first terminal 12 of a first processor device 11. Furthermore, using a second code line 21, for instance, an accumulator type of energy store device 30 is able to be transmitted to a second terminal 13 of first processor device 11. With the aid of defined pull-up resistors of digital control unit 10, electrical voltage dividers are formed. Generated voltage signals, which are analog quantities during standard operation of the power tool, are recorded by first processor device 11.

Thus, it is clear that the two terminals 12, 13 of first processor device 11 are normally used exclusively to receive specific analog quantities from energy store device 30.

This information is utilized to adapt an accumulator management in the tool-internal electronics. One of the main tasks of first processor device 11 of digital control unit 10 is to control the motor or accumulator current as a function of the read-in actual quantities of the analog values. In standard operation, terminals 12, 13 of first processor device 11 are permanently switched as input pins and operate in an analog-digital conversion mode.

Figure 1B:
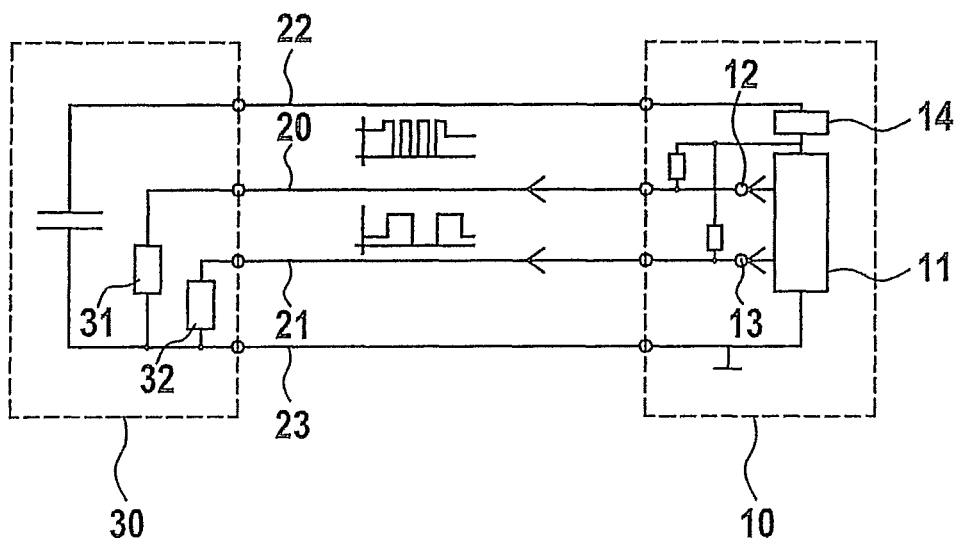
FIG. 1B illustrates a basic representation of an interface between the energy store device and a digital control unit of a power tool according to a first exemplary embodiment of the present invention.

In the present invention, it is now provided that terminals 12, 13 are switched over for communication operation during standard operation of the power tool. FIG. 1B shows a greatly simplified block diagram of the interface from FIG. 1A in communication operation, during which terminals 12, 13 of digital control unit 10 are now switched as outputs (indicated by directional arrows). Using code lines 20, 21, operating data of the power tool are transmitted by means of a defined digital protocol. For example, a timing signal is able to be transmitted in the process via first code line 20, and second code line 21 may be used to transmit a data signal which includes operating data of the power tool. The switchover between standard operation and communication operation of terminals 12, 13 preferably takes place periodically, so that the operating data of the power tool are therefore transmitted via code lines 20, 21 in periodic manner. In this way, communication operation advantageously interrupts standard operation of the interface only at specific times, so that the standard operation of the power tool may largely take place without interference.

Figure 2:
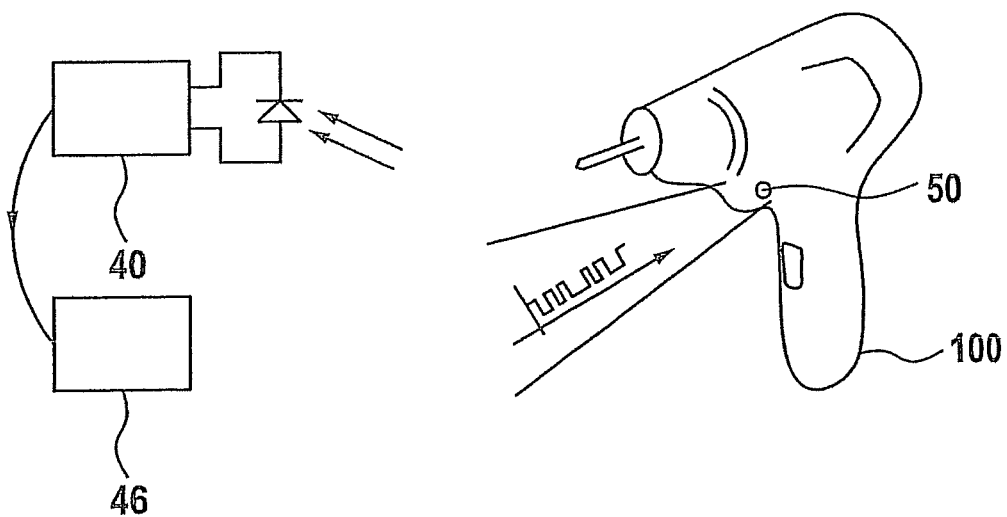
FIG. 2 illustrates a basic representation of another exemplary embodiment of the power tool according to the present invention.

FIG. 2 schematically shows another exemplary embodiment of power tool 100 according to the present invention. The figure shows a portable, battery-operated power tool 100 (e.g., a battery-operated screwdriver, drill, etc.) provided with a light-emitting diode (LED) 50, which, during standard operation, is used to illuminate a workspace, for example, or to indicate a charge state of the accumulator of power tool 100. Tool-internal control lines (not shown) for light-emitting diode 50, which are connected in electrically conductive manner to a tool-internal digital control unit (not shown), are used in the present invention to allow operating data of power tool 100 to be output in optically coded manner via light-emitting diode 50. FIG. 2 indicates this output in principle, the output operating data being acquired by a data acquisition device 40 by means of a photosensitive unit, and then transmitted to a display device 46 for a graphical display. In this way an existing infrastructure of power tool 100 in the form of control lines of light-emitting diode 50 is advantageously made use of, so that operating data of power tool 100 is able to be transmitted or made available for further use. As an alternative, it is also conceivable that no switch between standard operation and communication operation of the interface takes place for this purpose, but that the optically encoded data transmission is carried out in parallel with standard operation of power tool 100, in real time.

Figure 3:
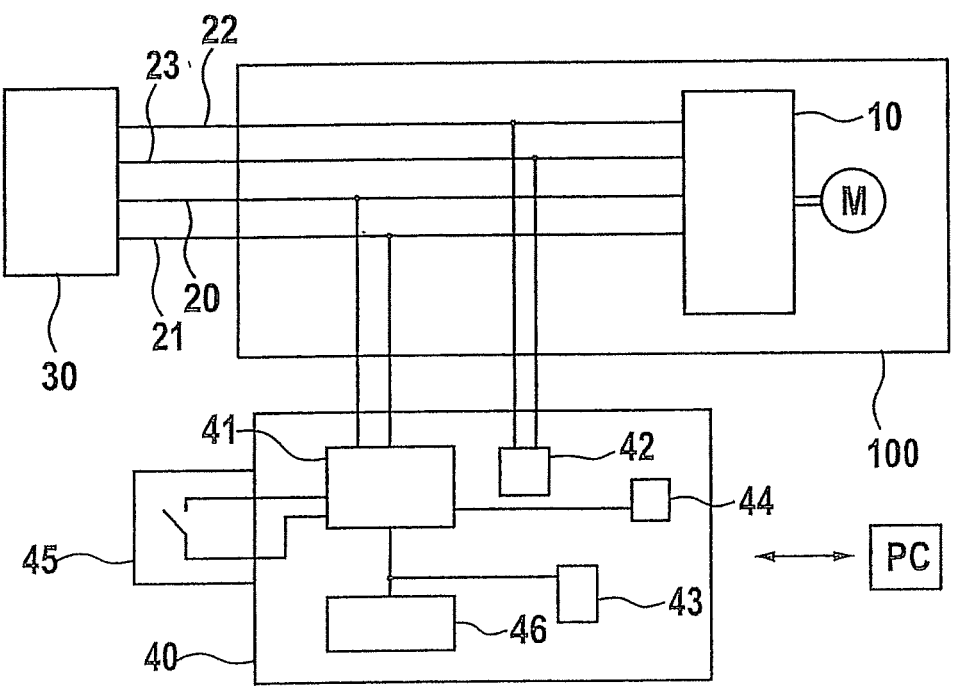
FIG. 3 illustrates a basic representation of an exemplary embodiment of the power tool according to the present invention, which has been supplemented by a data acquisition device.

FIG. 3 schematically shows another exemplary embodiment of power tool 100 according to the present invention, which has been supplemented by a data acquisition device 40. Data acquisition device 40 is situated outside of power tool 100 and utilized to receive the operating data via code lines 20, 21 of power tool 100 and to condition them for further use. Data acquisition device 40 includes a second processor device 41, to which the operating data are transmitted. The operating data are subsequently able to be made visible in data acquisition device 40 through a visual display 46 (e.g., a display) and/or stored by means of a storage device 43, which may be developed as read-only memory (e.g., an EEPROM) or as an exchangeable storage medium (e.g., SD, microSD card, etc.). Storing of the data by means of memory device 43 in Windows FAT format is also conceivable, so that the data are able to be read and analyzed by any Windows computer. Using an optional switch 45 of data acquisition device 40, it is possible to control a type of transmission of the operating data to data acquisition device 40 or the forwarding of the operating data by means of a transmission device 44 (e.g., cable, radio, WLAN, etc.) to a further computer.

It is also conceivable that data acquisition device 40 is situated inside power tool 100 (not shown in FIG. 3), which has the advantage that the operating data are recorded in a manner that is not visible to the user and are able to be downloaded from power tool 100 after a predefined usage period has elapsed, in order to analyze the data. This advantageously provides a type of data recording device, which is able to be "blindly" embedded in power tool 100 in miniaturized form.

As a modification of data acquisition device 40, it is conceivable to develop data acquisition device 40 as an accessory for accumulator tools, for diagnostic purposes. Conceivable uses for such a diagnosis adapter able to be mounted on power tool 100 are, for example: a counter featuring a graphics display, e.g., for counting screw connections implemented by the power tool; a torque display, which may be used to check whether a tool-internal electronics system supplies a requested torque; comfortable accumulator monitoring to display temperature, voltage, currents, used-up or still available charge in the accumulator; work hours performed by the power tool; as well as an rpm display of drill tools, angle grinders, circular saws, etc.

By a compact design of data acquisition device 40 and furthermore an implementation of a storage medium, it is therefore possible to realize a type of data recorder which records all operating data of power tool 100 over a defined period of time. In a prototype of power tool 100, this "data recorder" may be implemented internally, so that it is not visible from the outside. In still early project phases of a development of power tool 100, this makes it possible to collect empirical values and work foci from the field by retroactive analysis options concerning the operating data.

For example, drill and screw profiles can be determined, or the temperature behavior of the electronic systems or accumulator packs, etc. be analyzed. In this way, power tools are therefore advantageously able to be configured as required by customers/customer groups, or adapted to these requirements.

FIG. 4A shows a basic time diagram of a transmission of the operating data via dually assigned accumulator contacts of power tool 100 according to the present invention. It is obvious that, starting from standard operation, the tool-side electronic system switches to communication operation at an instant T1. The two code lines 20, 21 act as timing and data line, respectively, the first code line 20 being used as timing line, and second code line 21 being used as data line. In FIG. 4A, the temporal voltage characteristic on first code line 20 is denoted by $U_{20}$. The temporal voltage characteristic on second code line 21 is denoted by $U_{21}$. At the outset, a defined initialization byte $B_{init}$ is transmitted on the timing line, the data line being valid with each falling flank (alternatively, also with a positive flank). The data packet on the data line first begins with a predefined initialization byte $B_{init}$ (also referred to as synchronization byte). Thereafter, the entire data packet having the operating data B1, B2, B3, . . . Bn is transmitted over the data line, in serial form. After all n bytes have been transmitted, the transmission electronics switch back to standard operation at instant T2, and the analog input signal comes about again on both lines. The illustrated data transmission protocol is of course only an example and may be supplemented or modified as desired. For instance, each data byte may be assigned an additional, preceding synchronization byte (or address byte) in order to improve the interference susceptibility. In the event of interference, only a single data byte is then discarded, but not the entire data packet.

Figure 4B:
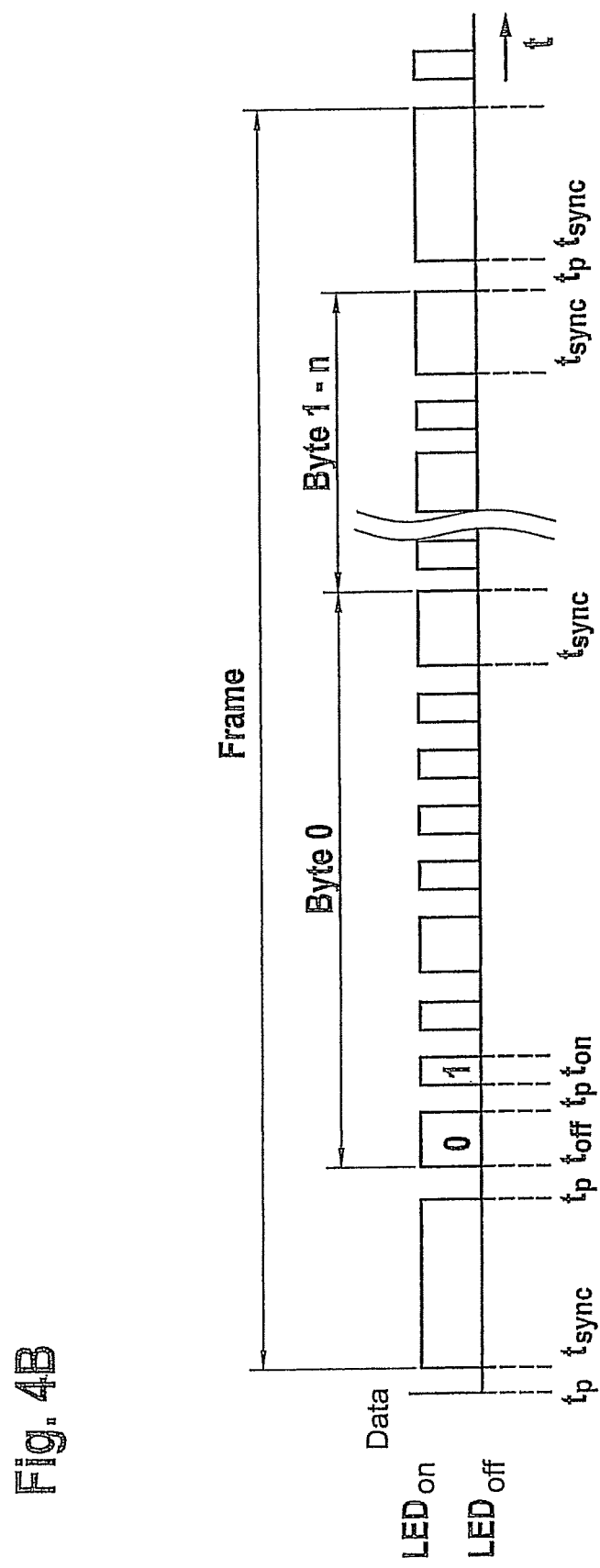
FIG. 4B illustrates a schematic time diagram of a data transmission according to the present invention, by means of a single-wire transmission or a transmission via an optical path.

FIG. 4B shows a basic time diagram of an operating data transmission according to the present invention via a type of pulse-length-encoding using a single-wire transmission or using an optically coded transmission via light-emitting electrode 50. In this case the data bytes are serially transmitted bit by bit within individual data packets ("frames"). Each data packet begins with a synchronization packet having a duration $t_{sync}$. This is followed by a defined pause $t_p$ and then the first byte is transmitted bit by bit, starting with byte 0. A defined pause also takes place between each pulse. A logical "0" is defined by a pulse length $t_{off}$ (LED off). A logical "1" is defined by a pulse length $t_{on}$ (LED on). After each transmitted byte the output of a byte synchronization having a predefined length $t_{sync}$ takes place. As soon as all bytes have been transmitted, the transmission cycle begins anew, once again preceded by a new synchronization packet.

The operating data transmission according to the present invention may also be carried out via supply lines 22, 23 by means of a suitable modulation method (not shown). As a result, the data transmission is also advantageous for systems having only two terminals (e.g., $v_{cc}$ and GND) of the accumulator interface.

Figure 5:
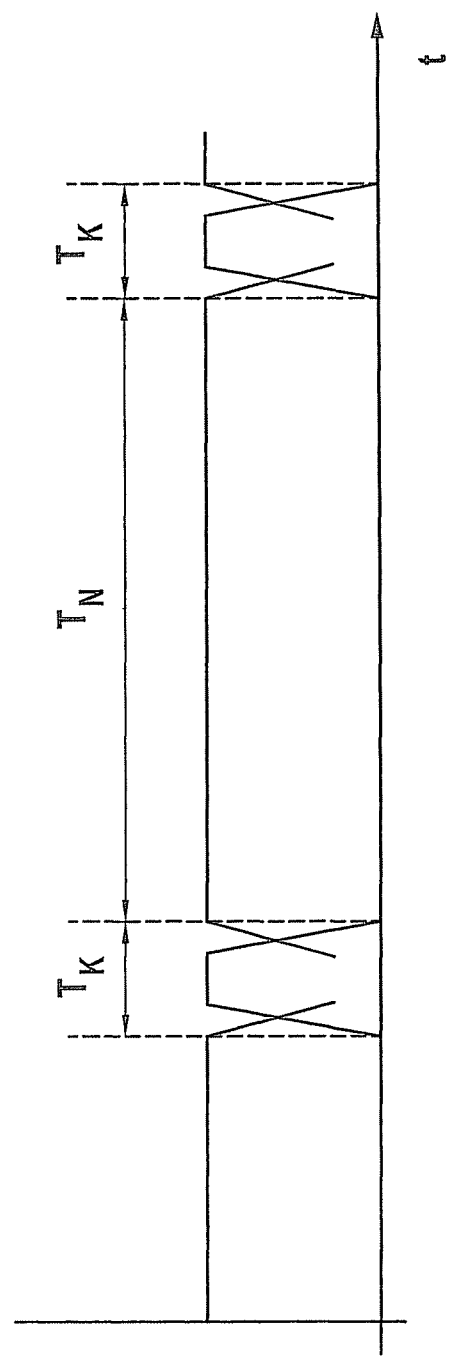
FIG. 5 illustrates a basic representation of the relationship between standard operation and communication operation of the power tool according to the present invention.

FIG. 5 qualitatively shows a time diagram which illustrates a duration T of a standard operation of power tool 100 in relation to a duration $T_K$ of a communication operation of power tool 100. It is clear from the figure that duration $T_N$ of standard operation predominates by far ($T_N \gg T_K$), the communication operation being active only for the duration required for the complete transmission of the operating data. In this way the standard operation of power tool 100 is advantageously affected as little as possible.

The following application areas are conceivable for the operating data transmission according to the present invention: customer request analyses, field tests during the predevelopment/development stage, production of electronics boards, diagnosis options for returns from the field, monitoring of continuous operation, readout of the software version of the power tool, and electronics identification. This enumeration is not complete, of course, and may be supplemented by additional application areas.

The present invention advantageously makes it possible to avoid any retroactive interventions in the power tool, so that the operating data are able to be provided in the simplest and most authentic manner possible, without modifying the physical marginal conditions of the power tool (e.g., by modified components or cable lengths, covering of ventilation devices by measuring cables, etc.).

In summary, the present invention provides a power tool which makes operating data of the power tool available in a comfortable manner. An already existing infrastructure of the power tool, in the form of an interface with a digital control device, is advantageously also utilized by the power tool according to the present invention, for the purpose of transmitting or outputting the operating data.

Due to the presence of the digital control unit, the switchover to communication operation is able to take place in an uncomplicated manner, under the control of software; instructions to the digital control unit for a periodic switchover of pins of a microprocessor from inputs to outputs are input into an operating software of the power tool according to the present invention. Using a predefined communication protocol, the output of the operating data may take place via a pin switched over in this manner. As a result, the present invention may be implemented as a supplementation of the already existing operating software of the power tool, which may be loaded as a simple software update and is able to be adapted in an uncomplicated manner.

One skilled in the art will know, of course, that the figures and the features of the present invention discussed in the above description may be modified and combined with each other in suitable manner without departing from the scope and spirit of the present invention.

What is claimed is:

1. A power tool, comprising:
  a digital control unit including a microprocessor; and
  an electrical energy store device connected to the digital control unit via at least one conductive line, the electrical energy store device including at least one of: an accumulator, or a battery;
  wherein an interface of the digital control unit is switchable periodically between standard operation and communication operation, in the standard operation the digital control unit receiving at least one analog signal from the electrical energy store device via the at least one conductive line, and in the communication operation the digital control unit transmitting at least one digital signal over the at least one conductive line, the at least one digital signal including operating data of the power tool, and
  wherein the interface is switchable periodically between the standard operation and the communication operation via a periodic switchover of input pins to output pins of the microprocessor.

2. The power tool according to claim 1, wherein the operating data are outputtable via one of supply lines and code lines of the interface.

3. The power tool according to claim 2, wherein the operating data are transmittable by a modulation system via the supply lines of the interface.

4. The power tool according to claim 1, wherein the interface is formed from control lines of a light-emitting diode of the power tool.

5. The power tool according to claim 1, wherein the operating data are storable in the standard operation of the power tool, by a storage device.

6. The power tool according to claim 5, wherein the stored operating data of the storage device are outputtable by the power tool by a transmission device.

7. The power tool according to claim 1, further comprising:
  a data acquisition device for acquiring the transmitted operating data.

8. The power tool according to claim 7, wherein the data acquisition device is situated one of inside and outside the power tool.

9. A data acquisition device, which cooperates with the power tool according to claim 1, in order to acquire the operating data of the power tool.

10. The data acquisition device according to claim 9, wherein the data acquisition device is developed as an adapter, which is attachable to the power tool.

11. The power tool according to claim 1, wherein the microprocessor initiates the communication operation by transmitting a initialization code over the at least one conductive line.

12. The power tool according to claim 1, wherein a period of the periodic switching of the interface is defined by a duration of the standard operation during the period and a duration of the communication operation during the period, the duration of the standard operation being greater than the duration of the communication operation.

13. The power tool according to claim 1, wherein the at least one analog signal includes a supply voltage.

14. The power tool according to claim 1, wherein the at least one analog signal includes a voltage indicating a temperature of the electrical energy store device.

15. The power tool according to claim 1, wherein the at least one analog signal includes a voltage indicating a type of the electrical energy store device.

16. The power tool according to claim 1, wherein the electrical energy store device includes at least one code resistor configured to provide the at least one analog signal as a voltage indicating at least one of: a temperature of the electrical energy store device, or a type of the electrical energy store device.

17. The power tool according to claim 1, wherein the input pins receive the at least one analog signal and the output pins provide the at least one digital signal.

18. The power tool according to claim 1, wherein the at least one conductive line includes at least two conductive lines, and the digital control unit transmits at least two digital signals over the at least two conductive lines during the communication operation, the at least two digital signals including a timing signal and a data signal.

19. The power tool according to claim 1, wherein the communication operation is for at least one of: customer request analyses, field tests during a predevelopment/development stage of the power tool, production of electronics boards, diagnosis options for returns from the field, monitoring of continuous operation of the power tool, readout of the software version of the power tool, and electronics identification.

20. A method for operating a power tool, the method comprising:
  switching over an interface of a digital control unit of the power tool between standard operation and communication operation, the digital control unit including a microprocessor and the power tool further including an electrical energy store device connected to the digital control unit via at least one conductive line, in the standard operation the digital control unit receiving at least one analog signal from the electrical energy store device via the at least one conductive line, and in the communication operation the digital control unit transmitting at least one digital signal over the at least one conductive line, the at least one digital signal including operating data of the power tool;

wherein the electrical energy store device includes at least one of: an accumulator, or a battery; and wherein the switching over between the standard operation and the communication operation takes place periodically via a periodic switchover of input pins to output pins of the microprocessor.

21. The method according to claim 20, further comprising:

storing the operating data by a storage device.

22. A computer program product having program code stored on a non-transitory computer-readable medium, wherein the program code instructs a programmable computer system to perform the method according to claim 20.

* * * * *